US012579324B2

(12) United States Patent  
Constant

(10) Patent No.: US 12,579,324 B2  
(45) Date of Patent: Mar. 17, 2026

(54) INLINE ENCRYPTOR ASIC

(71) Applicant: Rockwell Collins, Inc., Cedar Rapids, IA (US)

(72) Inventor: Joseph T. Constant, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 259 days.

(21) Appl. No.: 18/385,797

(22) Filed: Oct. 31, 2023

(65) Prior Publication Data

US 2025/0139297 A1    May 1, 2025

(51) Int. Cl.  
*G06F 21/72*    (2013.01)  
*G06F 21/60*    (2013.01)  
*G06F 21/85*    (2013.01)

(52) U.S. Cl.  
CPC ............ *G06F 21/72* (2013.01); *G06F 21/602* (2013.01); *G06F 21/85* (2013.01)

(58) Field of Classification Search  
CPC ......... G06F 21/72; G06F 21/602; G06F 21/85  
See application file for complete search history.

(56) References Cited

U.S. PATENT DOCUMENTS

| | | | | |
|---|---|---|---|---|
| 6,993,661 | B1 * | 1/2006 | Garfinkel | ............ G06F 21/6245 |
| | | | | 713/193 |
| 9,515,997 | B1 | 12/2016 | Westman et al. | |
| 9,600,239 | B2 | 3/2017 | Peeters et al. | |
| 10,956,346 | B1 | 3/2021 | Ben-Yehuda et al. | |
| 12,200,105 | B1 * | 1/2025 | Kampanakis | ......... H04L 9/0631 |

| | | | | |
|---|---|---|---|---|
| 2004/0054914 | A1 | 3/2004 | Sullivan | |
| 2011/0072184 | A1 * | 3/2011 | Tateyama | .............. G06F 13/385 |
| | | | | 710/308 |
| 2017/0270308 | A1 | 9/2017 | Nakayama et al. | |
| 2020/0143088 | A1 * | 5/2020 | Sunkavalli | .............. H04L 63/08 |
| 2020/0319805 | A1 | 10/2020 | Chang | |
| 2021/0382638 | A1 | 12/2021 | Anderson et al. | |
| 2022/0197825 | A1 | 6/2022 | Dewan et al. | |

OTHER PUBLICATIONS

Defense Counterintelligence and Security Agency Assessment and Authorization Process Manual—Version 2.2; https://www.dcsa.mil/Portals/128/Documents/IS/DCSA%20Assessment%20and%20Authorization%20Process%20Manual%20Version%202.2.pdf?ver=Rm1EHoxSQBYHOL00KO25IA%3D%3D; Publication date: Aug. 31, 2020.  
Guideline's for Media Sanitization, https://nvlpubs.nist.gov/nistpubs/specialpublications/nist.sp.800-88r1.pdf, Publication date: Dec. 1, 2014.  
The Commercial National Security Algorithm Suite 2.0 and Quantum Computing FAQ, https://media.defense.gov/2022/Sep/07/2003071836/-1/-1/0/CSI_CNSA_2.0_FAQ_. PDF, Publication date: Sep. 7, 2022.

* cited by examiner

*Primary Examiner* — Ayoub Alata  
(74) *Attorney, Agent, or Firm* — Suiter Swantz IP

(57)    ABSTRACT

An inline encryptor ASIC avoids contaminating memory with data which may be compromised by quantum computers. The inline encryptor ASIC encrypts the data using Post Quantum Cryptography algorithms before storing the data in the memory. The data in the memory is then resistant to quantum computer attacks. The inline encryptor ASIC may sanitize the memory via sanitizing a key used to encrypt the data. Sanitizing the memory by sanitizing the key enables writing CPI data to flash memory without requiring destruction of the flash memory.

12 Claims, 4 Drawing Sheets

200

INLINE ENCRYPTOR ASIC

TECHNICAL FIELD

The present invention generally relates to arrangements for transferring data, and more specifically to interfaces specially adapted for storage systems.

BACKGROUND

As of 2018, the Defense Counterintelligence and Security Agency (DCSA) does not allow for sanitization of flash memory. The sanitization of flash memory is an issue for memory types, such as Double Data Rate Synchronous Dynamic Random-Access Memory (DDR SRAM), which provide wear leveling. Memory with wear leveling can't be guaranteed to be sanitized.

Memory may be written to with Critical Program Information (CPI). Without the ability to sanitize the memory after writing CPI to the chip, the chip needs to be removed from the circuit card assembly (CCA) and destroyed to ensure destruction of the CPI. The chip may then be replaced on the CCA with a new chip. Removal of the chip and replacement with a new chip may damage adjacent components on the CCA. For example, the chip may be soldered to the CCA. Heating the solder may damage the adjacent components. Damaging the adjacent component may cause failure of the CCA. To prevent damaging the adjacent parts on the CCA while destroying the CPI, replacement of the CCA is the most viable option. However, replacing the CCA is costly and time consuming.

Therefore, it would be advantageous to provide a device, system, and method that cures the shortcomings described above.

SUMMARY

An inline encryptor ASIC is described. The inline encryptor ASIC comprises a first plurality of interfaces. The first plurality of interfaces transmit and receive plaintext data over a first plurality of traffic channels. The inline encryptor ASIC comprises a second plurality of interfaces. The second plurality of interfaces transmit and receive ciphertext data over a second plurality of traffic channels. Each of the first plurality of interfaces is paired with a matching of the second plurality of interfaces to perform a protocol break. The inline encryptor ASIC comprises one or more protocol engines. The inline encryptor ASIC comprises one or more key registers. The inline encryptor ASIC comprises a control engine. The control engine receives control data over a control channel. The control data comprises a plurality of keys. The control engine causes the plurality of key registers to maintain the plurality of keys. The inline encryptor ASIC comprises a plurality of encryption engines. The plurality of encryption engines are configured to execute one or more encryption algorithms. The one or more encryption algorithms comprise one or more Post Quantum Cryptography algorithms. The plurality of encryption engines are configured to encrypt the plaintext data to the ciphertext data and decrypt the ciphertext data to the plaintext data using the one or more encryption algorithms and the plurality of keys.

In some embodiments, at least one of the first plurality of interfaces comprises one of QSPI, SPI, SD, SDIO, eMMC, DDR, SATA, PCIe, CXL, Ethernet, SERDES.

In some embodiments, each of the first plurality of interfaces is assigned a dedicated protocol.

In some embodiments, at least two of the first plurality of interfaces share the dedicated protocol in common.

In some embodiments, the one or more protocol engines use a TCP/IP suite.

In some embodiments, the one or more protocol engines use a UDP/IP suite.

In some embodiments, the control engine receives the control data over the control channel using at least one of JTAG or SPI.

In some embodiments, the control data comprises a configuration of the one or more encryption algorithms. The control engine configures one or more encryption algorithms of the plurality of encryption engines based on the control data.

In some embodiments, the inline encryptor ASIC comprises one or more control registers. The one or more control registers specify a size of the plurality of keys and a configuration of the one or more protocol engines.

In some embodiments, the one or more Post Quantum Cryptography algorithms are selected from the group consisting of AES, CRYSTALS-Kyber, CRYSTALS-Dilithium, SHA, LMS, and XMSS.

In some embodiments, each of the first plurality of interfaces and the second plurality of interfaces is matched with a corresponding of the plurality of encryption engines.

In some embodiments, the plurality of keys are matched with a corresponding of the plurality of encryption engines.

In some embodiments, the control engine is configured to selectively sanitize the ciphertext data by selectively sanitizing an associated key from the one or more key registers.

A computing system is described. The computing system comprises an inline encryptor ASIC. The inline encryptor ASIC comprises a first plurality of interfaces. The first plurality of interfaces transmit and receive plaintext data over a first plurality of traffic channels. The inline encryptor ASIC comprises a second plurality of interfaces. The second plurality of interfaces transmit and receive ciphertext data over a second plurality of traffic channels. Each of the first plurality of interfaces is paired with a matching of the second plurality of interfaces to perform a protocol break. The inline encryptor ASIC comprises one or more protocol engines. The inline encryptor ASIC comprises one or more key registers. The inline encryptor ASIC comprises a control engine. The control engine receives control data over a control channel. The control data comprises a plurality of keys. The control engine causes the one or more key registers to maintain the plurality of keys. The inline encryptor ASIC comprises a plurality of encryption engines. The plurality of encryption engines are configured to execute one or more encryption algorithms. The one or more encryption algorithms comprise one or more Post Quantum Cryptography algorithms. The plurality of encryption engines are configured to encrypt the plaintext data to the ciphertext data and decrypt the ciphertext data to the plaintext data using the one or more encryption algorithms and the plurality of keys. The computing system comprises a CPU. The computing system comprises one or more peripherals. The inline encryptor ASIC is coupled between the CPU and the one or more peripherals.

In some embodiments, the inline encryptor ASIC prevents the CPU from writing the plaintext to the one or more peripherals.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
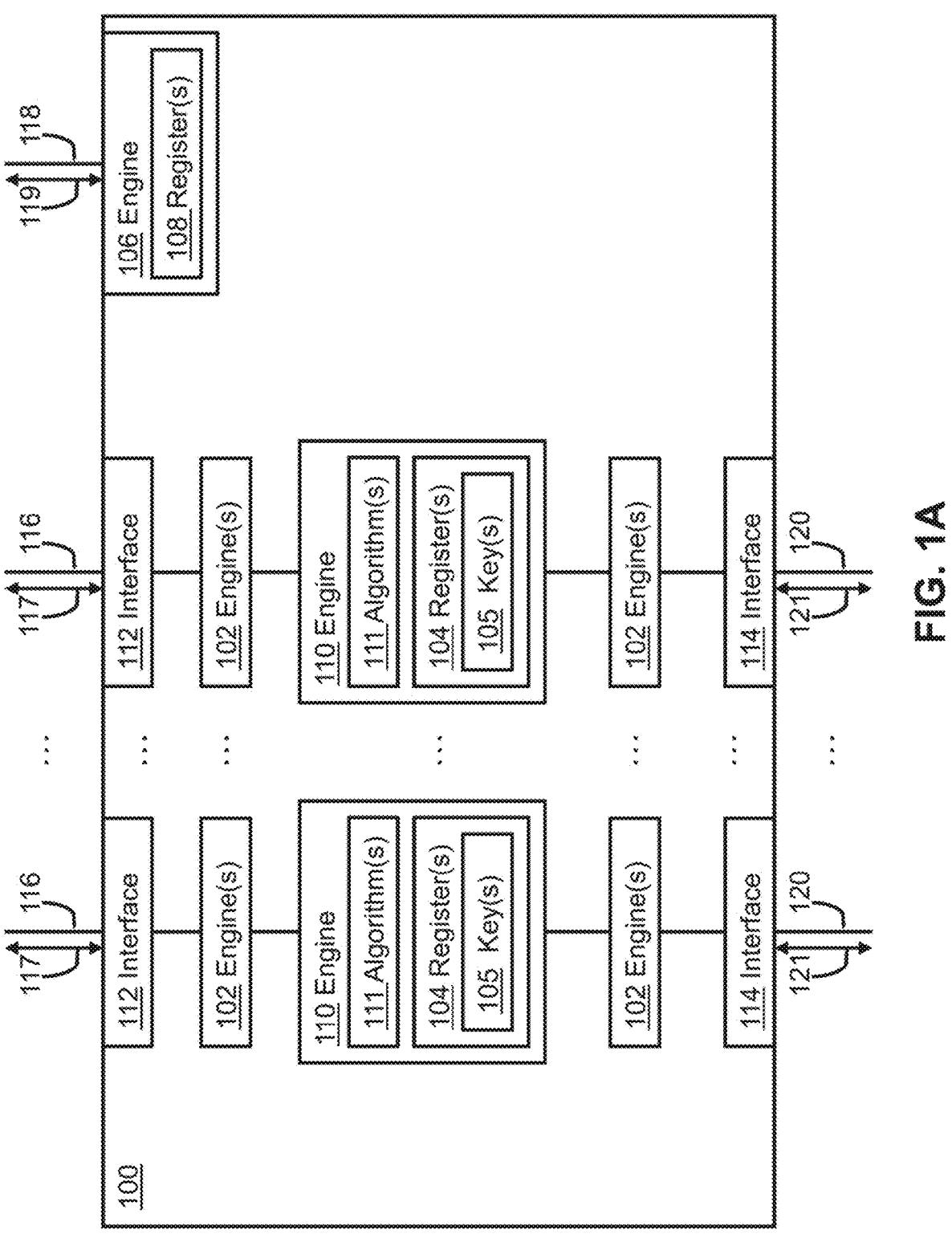
FIGS. 1A-1C depict a block diagram of an inline encryptor ASIC, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to an inline encryptor application specific integrated circuit (inline encryptor ASIC). The inline encryptor ASIC avoids contaminating memory with data which may be compromised by quantum computers. The inline encryptor ASIC encrypts the data using Post Quantum Cryptography algorithms before storing the data in the memory. The data in the memory is then resistant to attacks from quantum computers. The inline encryptor ASIC may sanitize the memory via sanitizing a key used to encrypt the data. Sanitizing the memory by sanitizing the key enables writing CPI data to flash memory without requiring destruction of the flash memory.

U.S. Pat. No. 9,515,997B1, titled "Inline data encryption"; U.S. Patent Publication Number US20040054914A1, titled "Method and apparatus for in-line serial data encryption"; U.S. Patent Publication Number US20220197825A1, titled "System, method and apparatus for total storage encryption"; U.S. Pat. No. 9,600,239B2, titled "Cryptographic accelerator"; U.S. Pat. No. 10,956,346B1, titled "Storage system having an in-line hardware accelerator"; U.S. Patent Publication Number US20170270308A1, titled "Security device and control method"; U.S. Patent Publication Number US20200319805A1, titled "Method for Writing Non-Volatile Memory of System-on-Chip"; U.S. Patent Publication Number US20210382638A1, titled "Data scrambler to mitigate row hammer corruption"; are incorporated herein by reference in the entirety.

Figure 1B:
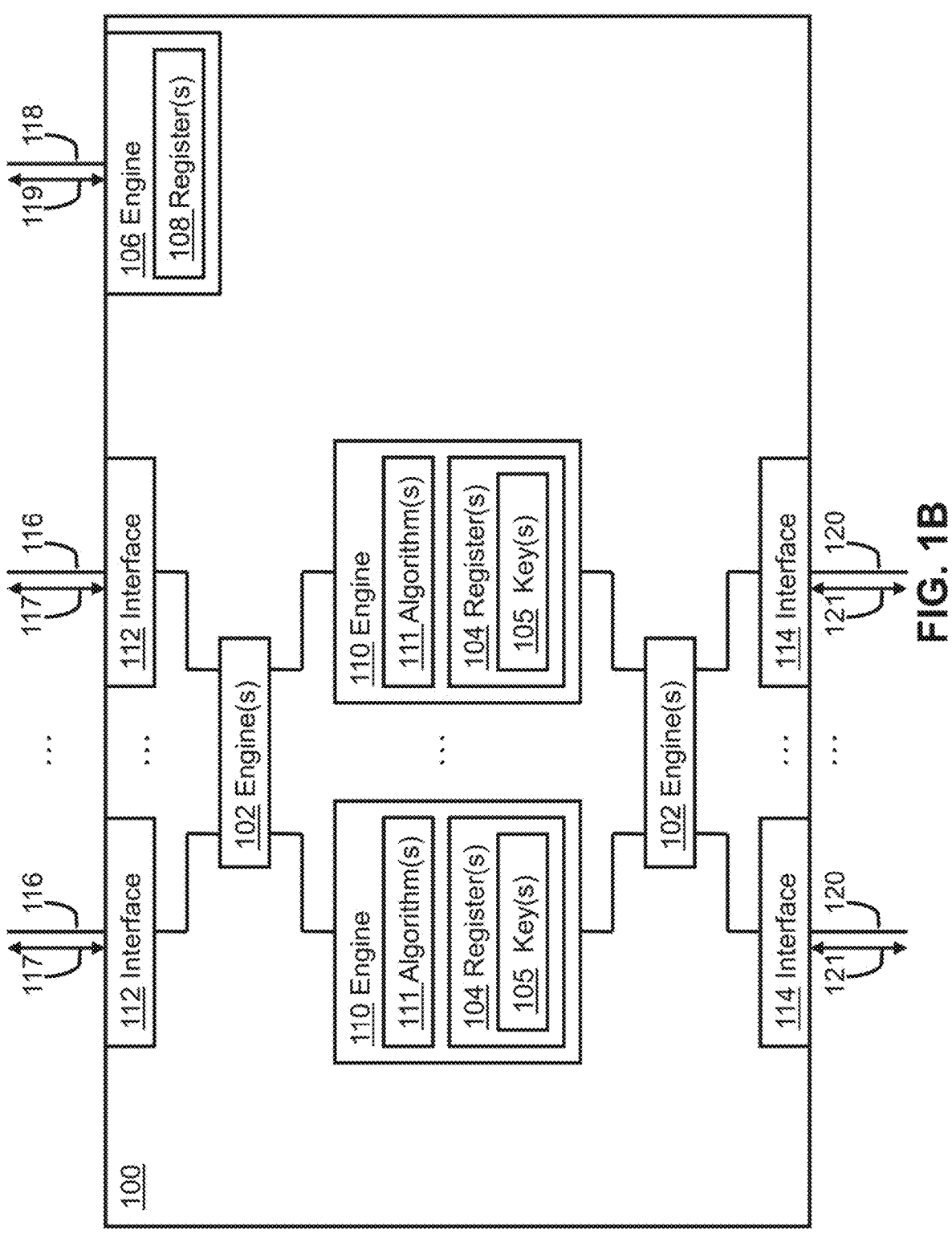
Figure 1C:
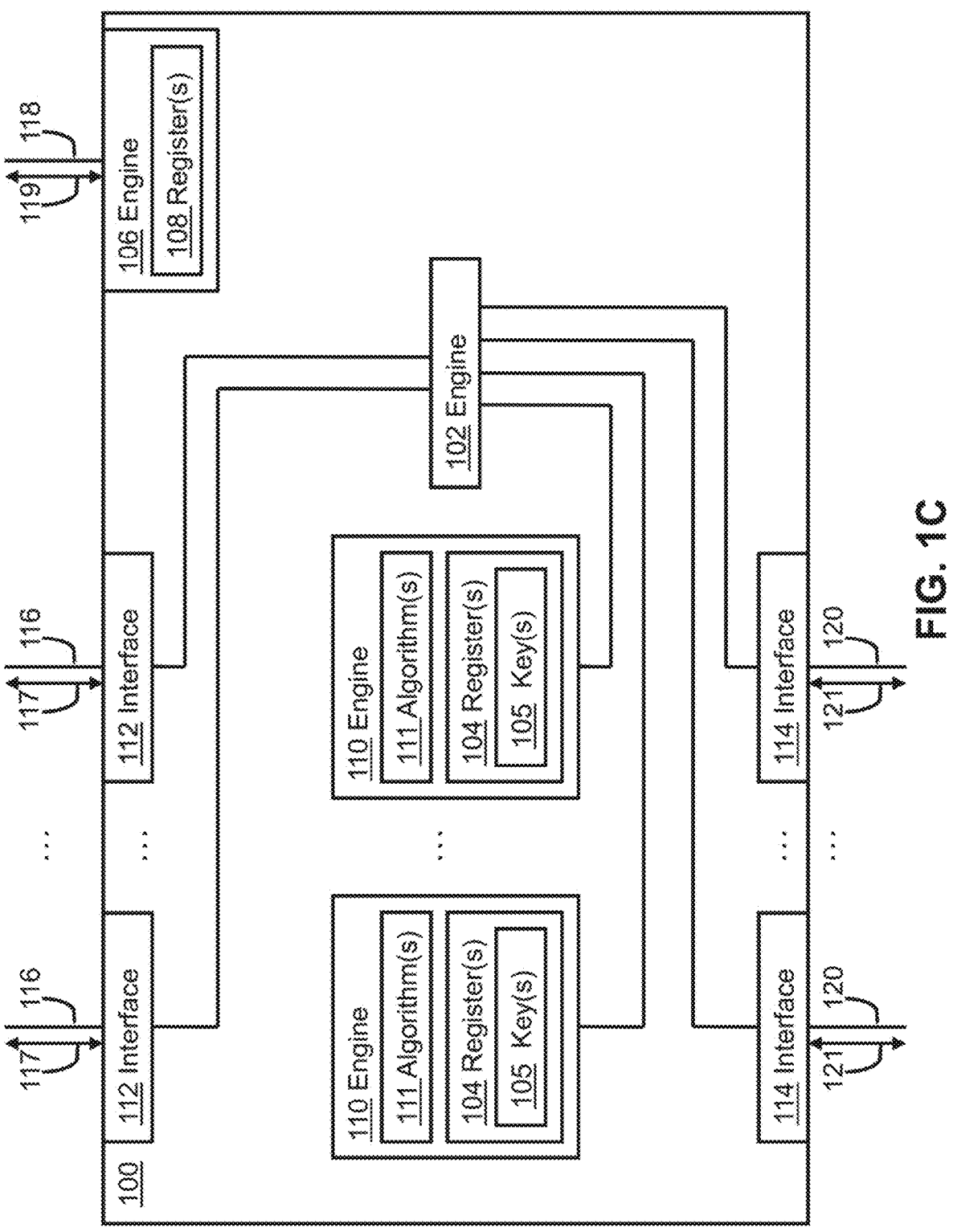

Referring now to FIGS. 1A-1C, an inline encryptor ASIC 100 is described, in accordance with one or more embodiments of the present disclosure. The inline encryptor ASIC 100 includes one or more components, such as, but not limited to, one or more protocol engines 102, one or more key registers 104, a control engine 106, one or more control registers 108, one or more encryption engines 110, one or more interfaces 112, one or more interfaces 114, and the like.

The inline encryptor ASIC 100 includes one or more of interfaces 112. The interfaces 112 may also be referred to as plaintext interfaces, ASIC-to-CPU interfaces, a first plurality of interfaces, or the like. The interfaces 112 may transmit and receive plaintext data 117 over traffic channels 116. The traffic channel 116 are communication channels which transmits the plaintext data 117. The traffic channels 116 may also be referred to as a first plurality of traffic channels. The plaintext data 117 is data which has not been encrypted using encryption algorithm 111. In this regard, the plaintext data 117 may also be referred to as non-CNSA 2.0 PQC encrypted data, quantum susceptible data, or the like.

The inline encryptor ASIC 100 includes one or more of interfaces 114. The interfaces 114 may also be referred to as ciphertext interfaces, ASIC-to-peripheral interfaces, a second plurality of interfaces, or the like. The interfaces 114 may transmit and receive ciphertext data 121 over traffic channels 120. The traffic channels 120 are communication channel which transmits the ciphertext data 121. The traffic channels 120 may also be referred to as a second plurality of traffic channels. The ciphertext data 121 is data which has been encrypted using encryption algorithm 111. The ciphertext data 121 is encrypted to protect the integrity and confidentiality of the data. The ciphertext data 121 is resistant to decryption by quantum computers. The ciphertext data 121 may withstand an attack from a cryptanalytically relevant quantum computer (CRQC). The ciphertext data 121 may be considered Quantum-resistant (QR), quantum-safe, and/or post-quantum (PQ).

The plaintext data 117 and ciphertext data 121 may include, but is not limited to, any suitable data. Data may refer to pieces of information from which understandable information is derived. The data may include software, IP addresses, hostnames, usernames and passwords, certificates, Critical Program Information (CPI), or other data that may be considered sensitive.

The interfaces 112 and the interfaces 114 may each include any suitable CPU-to-peripheral interfaces. For example, the interfaces 112 and the interfaces 114 may include, but are not limited to, Quad Serial Peripheral Interface (QSPI), Serial Peripheral Interface (SPI), Secure Digital (SD), SD Input/Output (SDIO), Embedded Multi-MediaCard (eMMC), Double Data Rate (DDR), Serial Advanced Technology Attachment (SATA), Peripheral Component Interconnect express (PCIe), Compute Express Link (CXL), Ethernet, and/or Serializer/De-serializer (SERDES).

Each of the interfaces 112 and the interfaces 114 may include one or more pins. The number of the pins may be based on the protocol (e.g., QSPI, SPI, SD, SDIO, eMMC, DDR, SATA, PCIe, CXL, Ethernet, SERDES).

The inline encryptor ASIC 100 supports communication to CPUs 202 and/or peripherals 204 via one or more protocols. The traffic channels 116 have a dedicated protocol. Each of the interfaces 112 is assigned a dedicated protocol. The interfaces 112 handling a dedicated protocol reduces flow control issues associated with handling multiple protocols on one traffic channel 116. For example, handling multiple protocols on one traffic channel 116 may raise issues maintaining a connection.

The interfaces 112 may or may not share the dedicated protocols in common. In some embodiments, at least two of the interfaces 112 share the dedicated protocol in common. For example, a first interface of the interfaces 112 may be PCIe, a second interface of the interfaces 112 may be QSPI, a third interface of the interfaces 112 may be QSPI, a fourth interface of the of the interfaces 112 may be DDR, and a fifth interface of the interfaces 112 may be Ethernet. In this example, the second interface and the third interface of the interfaces 112 share the QPSI protocol in common. This example is designed to mirror a specific configuration of an example CPU with interfaces of PCIe, QSPI, DDR, and Ethernet, and is not intended to be limiting.

The interfaces 112 are paired with the interfaces 114. In this regard, each of the interfaces 112 includes a matching of the interfaces 114. Each of the interfaces 112 are paired with a matching of the interfaces 114 to perform a protocol break. With reference to the previous examples of the interfaces 112: a first interface of the interfaces 114 may be PCIe, a second interface of the interfaces 114 may be QSPI, a third interface of the interfaces 114 may be QSPI, a fourth interface of the of the interfaces 114 may be DDR, and a fifth interface of the interfaces 114 may be Ethernet.

The inline encryptor ASIC 100 includes one or more protocol engines 102. The protocol engines 102 may also be referred to as a peripheral protocol engine. The protocol engines 102 handle the transmission and reception of the plaintext data 117 via the interfaces 112 and the ciphertext data 121 via the interfaces 114. The protocol engines 102 ensure that the plaintext data 117 and ciphertext data 121 are transmitted and received according to the protocols.

The protocol engines 102 are coupled between the interfaces 112, the interfaces 114, and/or the encryption engines 110. The protocol engines 102 are a buffer between the interfaces 112 and the encryption engines 110. The protocol engines 102 are also a buffer between the interfaces 114 and the encryption engines 110. In some embodiments, the inline encryptor ASIC 100 includes the protocol engines 102 on either side of the encryption engines 110. For example, the inline encryptor ASIC 100 may include the protocol engines 102 on either side of the encryption engines 110. Each of the interfaces 112 and the interfaces 114 may be connected to a dedicated of the protocol engines 102. It is further contemplated that the interfaces 112 may share a first of the protocol engines 102 and the interfaces 114 may share a second of the protocol engines 102. By way of another example, the protocol engine 102 may include a direction connection between the encryption engines 110, the interfaces 112, and the interfaces 114. The protocol engine 102 may act as a bridge between the interfaces 112, the encryption engines 110, and the interfaces 114 where the protocol engine 102 is connected between the encryption engines 110, the interfaces 112, and the interfaces 114.

The protocol engines 102 support a variety of protocols, such as, but not limited to, QSPI, SPI, SD, SDIO, eMMC, DDR, SATA, PCIe, CXL, Ethernet, SERDES, and the like. Each of the protocols have specifications to which the peripheral protocol engine adheres. For example, the protocol engines 102 execute an instruction set adapted for operations that occur in the implementation of the protocols. The operations may include bit masking, shifting, comparisons, clock synchronization, and the like.

In some embodiments, the protocol engines 102 may uses a Transmission Control Protocol/Internet Protocol (TCP/IP) suite and/or a User Datagram Protocol/Internet Protocol (UDP/IP) suite. The plaintext data 117 and/or the ciphertext data 121 may be encapsulated by various headers and footers according to the IP. For example, the plaintext data 117 and/or the ciphertext data 121 may be encapsulated by UDP/TCP headers, IP headers, frame headers, and the like. The protocol engines 102 may handle the encapsulation of the plaintext data 117 and/or the ciphertext data 121 by the headers and footers according to the IP. In some embodiments, the inline encryptor ASIC 100 supports TLS encryption.

In some embodiments, the protocol engines 102 may include a network layer interface (i.e., OSI Layer 3). The network layer interface is responsible for routing, directing datagrams from one network to another. The network layer interface may include the IP. The inline encryptor ASIC 100 may receive packets which a fragmented from a datagram. The network layer interface may reassemble the datagram from the packets. The network layer interface may also remove the associated headers from the plaintext data 117. For example, the network layer interface may remove IP headers or the like. The protocol engines 102 may support any IP version. For example, the protocol engines 102 may support IPV4, IPV6, or the like.

In some embodiments, the protocol engines 102 may include a transport layer interface (i.e., OSI Layer 4). The transport layer interface subdivides user-buffer into network-buffer sized datagrams and enforces desired transmission control. The transport layer interface may include Transmission Control Protocol (TCP) and/or User Datagram Protocol (UDP). The transport layer interface may also remove the associated headers from the plaintext data 117. For example, the transport layer interface may remove TCP/UDP headers or the like. In some embodiments, the protocol engines 102 may automatically determine whether UDP or TCP is used. For example, the protocol engines 102 may determine the location of the plaintext data 117 in a payload received over the traffic channel 116.

The inline encryptor ASIC 100 includes key registers 104. The key registers 104 maintain one or more keys 105. The keys 105 may also be referred to as cryptographic keys.

The inline encryptor ASIC 100 includes control engine 106. The control engine 106 may receive the control data 119 over the control channel 118 using one or more protocols. For example, the control engine 106 may communicate over the control channel 118 using joint test action group (JTAG), serial programming interface (SPI), or the like.

The control engine 106 receives control data 119 over a control channel 118. The control data 119 may include the configuration of the protocol engines 102, the keys 105, the configuration of the encryption algorithms 111, and the like. The control engine 106 loads the configuration of the protocol engines 102, the encryption algorithms 111, and the keys 105. The control engine 106 may configure the protocols of the protocol engines 102 based on the control data 119. The control engine 106 may configure the encryption algorithms 111 of the encryption engines 110 based on the control data 119. The control engine 106 is configured to program the keys 105 in the key registers 104. In some embodiments, the configuration of the protocol engines 102, the keys 105, and the encryption algorithms 111 are configured when bringing up the traffic channels 116. In some embodiments, the keys 105 are preprogrammed in the key registers 104. The keys 105 may be preprogrammed in the key registers 104 via the control engine 106. The control engine 106 may be coupled to an externally controllable interface (e.g., JTAG).

The inline encryptor ASIC 100 includes one or more control registers 108. The control registers 108 may also be referred to as configuration registers. In some embodiments, the control registers 108 are maintained in the control engine 106.

The control register 108 may include one or more configurations of the encryption engines 110. The control register 108 may specify a size of the keys 105. The control register 108 may also specify which of the encryption algorithms 111 the encryption engine 110 uses to encrypt and decrypt the data.

In some embodiments, the control engine 106 may configure the protocols used by protocol engines 102 for the interfaces 112 via the control data 119. For example, the control engine 106 may configure the protocols used by protocol engines 102 for the interfaces 112 when the keys 105 are received. The control register 108 may include one or more configurations of the protocol engines 102. For example, the control register 108 may specify the protocol used by the protocol engines 102 when communicating over the interfaces 112 and/or the interfaces 114.

The inline encryptor ASIC 100 includes one or more of the encryption engines 110. The encryption engines 110 may also be referred to as a cryptography accelerator engine, a cryptographic accelerator, a cryptographic circuit, an encryption circuit, or the like.

The encryption engines 110 may be coupled to the interfaces 112 and the interfaces 114. The plaintext data 117 is transmitted to and received from the interfaces 112 by the encryption engines 110. The ciphertext data 121 is transmitted to and received from the interfaces 114 by the encryption engines 110. For example, the encryption engines 110 receive the plaintext data 117 from the interfaces 112, encrypt the plaintext data 117 to the ciphertext data 121, and transmit the ciphertext data 121 to the interfaces 114. By way of another example, the encryption engines 110 receive the ciphertext data 121 from the interfaces 114, decrypt the ciphertext data 121 to the plaintext data 117, and transmit the plaintext data 117 to the interfaces 112.

The encryption engines 110 are configured to execute one or more encryption algorithms 111. The encryption algorithms 111 are Post Quantum Cryptography algorithms. For example, the encryption algorithms 111 include one or more Commercial National Security Algorithm 2.0 Post Quantum Cryptography (CNSA 2.0 PQC) algorithms. In this regard, the encryption engine 110 is a CNSA 2.0 PQC encryption engine. The CNSA 2.0 PQC algorithms may be selected from the group consisting of Advanced Encryption Standard (AES) (e.g., AES-256), Cryptographic Suite for Algebraic Lattices (CRYSTALS)-Kyber, CRYSTALS-Dilithium, Secure Hash Algorithm (SHA) (e.g., SHA-384, SHA-512), Leighton-Micali Signature (LMS), and Xtended Merkle Signature Scheme (XMSS). The CNSA 2.0 PQC algorithms are resistant to decryption by quantum computing.

The encryption algorithms 111 may include symmetric encryption algorithms and/or asymmetric encryption algorithms. The symmetric encryption algorithms include AES and SHA. The asymmetric encryption algorithms include CRYSTALS-Kyber, CRYSTALS-Dilithium, LMS, and XMSS.

The encryption engines 110 are configured to encrypt the plaintext data 117 to ciphertext data 121 and decrypt the ciphertext data 121 to the plaintext data 117 using the encryption algorithms 111 and the keys 105. The encryption engines 110 may retrieve the keys 105 from the key registers 104 when encrypting the plaintext data 117 and decrypting ciphertext data 121. The encryption engines 110 may receive the plaintext data 117 and encrypt the plaintext data 117 to the ciphertext data 121 using the encryption algorithms 111 and the keys 105. The inline encryptor ASIC 100 may then transmit the ciphertext data 121 via the interfaces 114. The encryption engines 110 may receive the ciphertext data 121 and encrypt the ciphertext data 121 to the plaintext data 117 using the encryption algorithms 111 and the keys 105. The inline encryptor ASIC 100 may then transmit the plaintext data 117 via the interfaces 112.

In some embodiments, each of the interfaces 112 and the interfaces 114 is matched with a corresponding of the encryption engines 110. For example, a first of the interfaces 112 and a first of the interfaces 114 is matched with a first of the encryption engines 110. Matching each of the interfaces 112 and the interfaces 114 matched with a corresponding of the encryption engines 110 reduces the latency of encrypting the plaintext data 117 and decrypting the ciphertext data 121. Reducing the latency of encrypting the plaintext data 117 and decrypting the ciphertext data 121 is advantageous to reduce a latency between the CPU 202 and the peripherals 204. It is further contemplated that the interfaces 112 and the interfaces 114 may share one or more of the encryption engines. For example, a first and second of the interfaces 112 and interfaces 114 may share a first of the encryption engines 110. Such arrangement may undesirably introduce latency.

In some embodiments, the keys 105 are matched with a corresponding of the encryption engines 110. The key registers 104 may maintain an independent key for each of the encryption engines 110 to match the keys 105 to a corresponding of the encryption engines 110. For example, a first of the keys 105 may correspond to a first of the encryption engines 110, and so one. In some embodiments, the key registers 104 are maintained in the encryption engines 110.

In some embodiments, the control engine 106 is configured to selectively sanitize ciphertext data 121 by selectively sanitizing the associated key from the key registers 104. Matching the keys with a corresponding of the encryption engines 110 is beneficial for selectively sanitizing the traffic channels 120 and the peripherals 204 connected to the traffic channels 120. For example, a peripheral connected to a first of the interfaces 114 over a first traffic channel 120 may be retired while keeping a remainder of the peripherals connected the remainder of the interfaces 114 active. The key 105 associated with the first encryption engine 110 may be sanitized from the key register 104. Sanitizing the key 105 associated with the first encryption engine 110 prevents the decryption of the ciphertext data 121 maintained on the first peripheral. The remainder of the keys 105 may remain active in the key register 104, allowing the remainder of the encryption engines 110 to decrypt the ciphertext data 121 from the remainder of the peripherals. Thus, peripherals, such as flash memory, may be sanitized merely by removing the keys 105 from the key register 104. In this regard, the inline encryptor ASIC 100 does not use the same key for each of the encryption engines 110. of each of the external devices.

Figure 2:
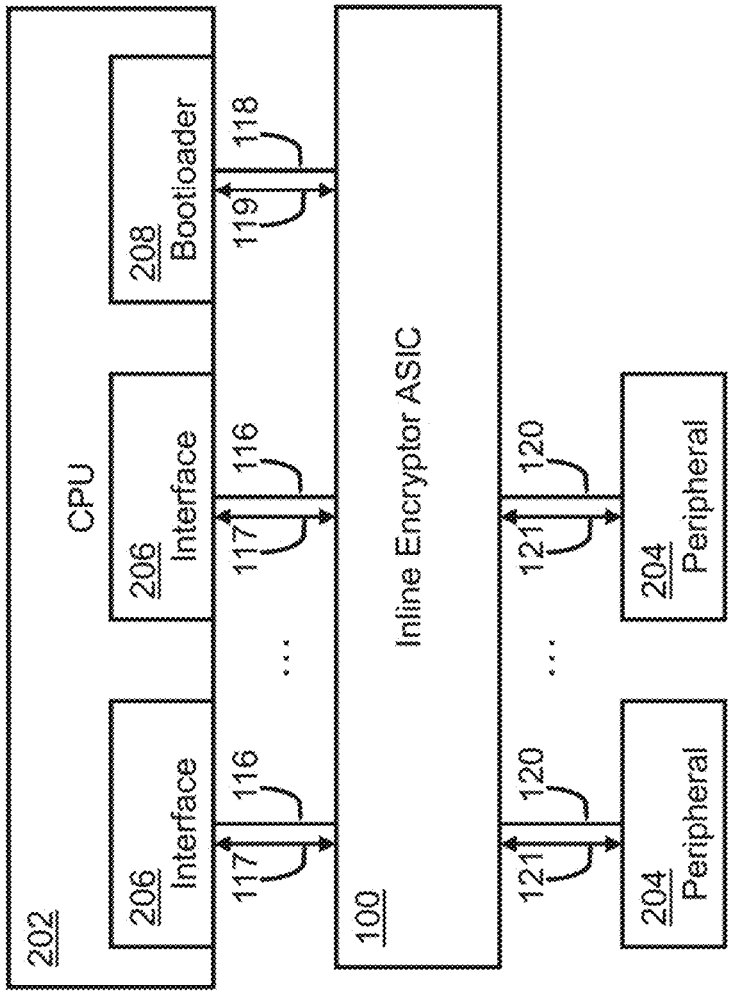
FIG. 2 depicts a block diagram of a computer system, in accordance with one or more embodiments of the present disclosure.

Referring now to FIG. 2, a computing system 200 is described, in accordance with one or more embodiments of the present disclosure. The computing system 200 includes one or more components, such as, but not limited to, the inline encryptor ASIC 100, CPU 202 (central processing unit), one or more peripherals 204, and the like.

The computing system 200 includes the CPU 202. The CPU 202 may include any processor architecture, instruction set, and the like. For example, instruction set may include x86, ARM®, PowerPC®, and the like. The inline encryptor ASIC 100 is compatible with any number of CPU architectures. The inline encryptor ASIC 100 may handle any of the various instruction sets of the CPU 202. In this regard, the inline encryptor ASIC 100 is processor agnostic. The inline encryptor ASIC 100 is processor agnostic because the protocols that the CPU 202 uses to talk to the peripherals 204 are also processor agnostic.

The CPU 202 may or may not support CNSA 2.0 Post Quantum Cryptography (PQC) algorithms. It is contemplated that the inline encryptor ASIC 100 may be useful where the CPU 202 is not configured with cryptographic hardware accelerators using CNSA 2.0 PQC algorithms.

The CPU 202 includes bootloader 208. The bootloader 208 may also be referred to as a boot manager, a bootstrap, or the like. The bootloader 208 is executed by the CPU 202 from on-chip memory.

The bootloader 208 performs an initial bring up of the inline encryptor ASIC 100. The bootloader 208 may transmit the control data 119 to the control engine 106 over the control channel 118. The control data 119 may include the keys 105 and the configuration of the encryption algorithms 111. The control channel 118 may be used to load the keys 105 into the inline encryptor ASIC 100 and store the keys 105 in the key register 104. For example, the keys 105 may be loaded over the control channel 118 using JTAG, SPI, or the like. The bootloader 208 may also cause the control engine 106 to configure the encryption algorithm 111 via the control data 119 over the control channel 118.

In some embodiments, the CPU 202 causes the control engine 106 to program the keys 105 in the key registers 104 before the CPU 202 brings up an operating system and/or loads application software. For example, the bootloader 208 may cause the control engine 106 to program the keys 105 in the key registers 104 via the control channel 118. The keys 105 are programmed prior because the operating system and/or application software are not able to fit in on-chip memory of the inline encryptor ASIC 100.

Although the bootloader 208 is described as programming the key 105 in the key registers 104, this is not intended as a limitation of the present disclosure. The bootloader 208 may not perform any configuration of the keys 105. Instead, the inline encryptor ASIC 100 may be preconfigured with the keys 105. For example, the inline encryptor ASIC 100 may be preconfigured with the keys 105 via the control data 119 over the control channel 118 from one or more external sources of memory or another external source.

The CPU 202 includes one or more interfaces 206. The interfaces 206 may each include Quad Serial Peripheral Interface (QSPI), Serial Peripheral Interface (SPI), Secure Digital (SD), SD Input/Output (SDIO), Embedded Multi-MediaCard (eMMC), Double Data Rate (DDR), Serial Advanced Technology Attachment (SATA), Peripheral Component Interconnect express (PCIe), Compute Express Link (CXL), Ethernet, and/or Serializer/De-serializer (SERDES).

The interfaces 112 are paired with and coupled to the interfaces 206. The interfaces 112 of the inline encryptor ASIC 100 mirror the interfaces 206 of the CPU 202. In some embodiments, the protocol engines 102 perform a protocol break between the CPU 202 and the peripherals 204. From the perspective of the CPU 202, the CPU 202 talks directly to the peripherals 204. The CPU 202 interfaces with the peripherals 204 via the inline encryptor ASIC 100. Interfacing with the peripherals 204 appears seamless to the CPU 202. The protocol engines 102 intercept the plaintext data 117 over the traffic channels 116. The protocol engines 102 perform various exchanges to implement the protocol break.

In some embodiments, the protocol engines 102 may encapsulate the plaintext data 117 and the ciphertext data 121 with the headers and footers (e.g., where the interfaces are Ethernet interface). For example, the protocol engines 102 receive the plaintext data 117 as one or more packets over the traffic channels 116. The protocol engines 102 remove the headers associated with layers 3 and 4 from the plaintext data 117. The encryption engine 110 encrypts the plaintext data 117 (e.g., data associated with the layers 5, 6, and 7 of the packets) to the ciphertext data 121. The protocol engines 102 then encapsulate the ciphertext data 121 with the headers associated with layers 3 and 4. The ciphertext data 121 is then transmitted from the interface 114 over the traffic channels 120. By way of another example, the protocol engines 102 receive the ciphertext data 121 as one or more packets over the traffic channels 120. The protocol engines 102 remove the headers associated with layers 3 and 4 from the ciphertext data 121. The encryption engine 110 decrypts the ciphertext data 121 (e.g., data associated with the layers 5, 6, and 7 of the packets) to the plaintext data 117. The protocol engines 102 then encapsulate the plaintext data 117 with the headers associated with layers 3 and 4. The plaintext data 117 is then transmitted from the interface 112 over the traffic channels 116.

The computing system 200 includes peripherals 204. The peripherals 204 are peripheral components which are external to the CPU 202. The peripherals 204 may include memory. The memory may include a memory, an Ethernet port, and the like. The memory may include a hard drive, random-access memory (RAM) (e.g., DDR SDRAM), flash memory (e.g., Flash EPROM (FEPROM)), and the like. In some embodiments, the peripherals 204 include flash memory which provides wear leveling.

The inline encryptor ASIC may be coupled to one or more peripherals 204. The inline encryptor ASIC 100 is coupled between the CPU 202 and the peripheral 204. The inline encryptor ASIC 100 prevents the CPU 202 from writing the plaintext data 117 to the one or more peripherals 204. The inline encryptor ASIC 100 supports encryption/decryption for all data being written to and read from the peripherals 204. The inline encryptor ASIC 100 Protects both Data-in- Transit (DIT) and Data-at-Rest (DAR). For example, the ciphertext data 121 is protected during transit and when maintained in memory by being encrypted.

In some embodiments, the peripherals 204 are memory. The memory stores the ciphertext data 121. The ciphertext data 121 is unrecoverable without the key 105 used to encrypt the ciphertext data 121. If the key 105 is sanitized, then the ciphertext data 121 is unrecoverable. The ciphertext data 121 maintained on the memory may be cryptographically erased by sanitizing the key 105 on the key register 104, without sanitizing the memory. Cryptographic erase refers to a method of sanitization in which the key 105 for the ciphertext data 121 is sanitized, making recovery of the decrypted target data infeasible. Sanitizing the key 105 on the key register 104 to sanitize the ciphertext data 121 maintain on the memory is desirable to prevent the need to destroy the memory (e.g., where the memory is flash memory which is not able to be otherwise sanitized due to DCSA requirements). The ciphertext data 121 is written to the memory. The plaintext data 117 is not written to the memory. If the plaintext data 117 is not written to the memory, there is no need to sanitize memory.

Referring generally again to FIGS. 1A-2. It is contemplated that the inline encryptor ASIC 100 may be utilized in several applications which needs to maximize confidentiality, protect data-at-rest and data-in-transit, as well as support CNSA 2.0 PQC algorithms. For example, the inline encryptor ASIC 100 may be used by any mission systems program. The mission systems programs may provide the flight controls for an aircraft. By way of another example, the inline encryptor ASIC 100 may be used in other highly protected information, such as Critical Program Information (CPI).

Although the CPU 202 is described as executing the bootloader 208, this is not intended as a limitation of the present disclosure. It is contemplated that the bootloader 208 may be executed external to the CPU 202. For example, a device external to the CPU 202 may execute the bootloader 208.

A register generally refers to a memory architecture. The registers allow operations to be performed from memory. The registers may or may not be persistent. The register may include any storage medium known in the art suitable for storing program instructions, keys, and the like. For example, the register may include a non-transitory memory medium. By way of another example, the register may include, but is not limited to, a read-only memory (ROM), a random-access memory (RAM), a magnetic or optical memory device (e.g., disk), a magnetic tape, a solid-state drive and the like. It is further noted that memory medium may be housed in a housing with the one or more processors.

An engine generally refers to software or hardware and/or a combination thereof, such as firmware. The engine may include any processor or processing element known in the art. The engine may encompass one or more processing or logic elements. In this sense, the engine may include any device configured to execute algorithms and/or instructions (e.g., program instructions stored in memory). Moreover, the engine may include a processor or logic elements suitable for carrying out at least a portion of the steps described in the present disclosure. The engines are configured to execute program instructions maintained on the memory causing the processors to perform any of the various functions described herein. Therefore, the above description should not be interpreted as a limitation on the embodiments of the present disclosure but merely as an illustration.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all material advantages. The form described is merely explanatory, and it is the intention of the following claims to encompass and include such changes. Furthermore, it is to be understood that the invention is defined by the appended claims.

14

What is claimed:

1. An inline encryptor application specific integrated circuit (inline encryptor ASIC) comprising:
a first plurality of interfaces; wherein the first plurality of interfaces transmit and receive plaintext data over a first plurality of traffic channels;
a second plurality of interfaces; wherein the second plurality of interfaces transmit and receive ciphertext data over a second plurality of traffic channels; wherein each of the first plurality of interfaces is paired with a matching of the second plurality of interfaces to perform a protocol break;
one or more protocol engines;
one or more key registers;
a control engine; wherein the control engine receives control data over a control channel; wherein the control data comprises a plurality of keys; wherein the control engine causes one or more key registers to maintain the plurality of keys; and
a plurality of encryption engines; wherein the plurality of encryption engines are configured to execute one or more encryption algorithms; wherein the one or more encryption algorithms comprise one or more Post Quantum Cryptography algorithms; wherein the plurality of encryption engines are configured to encrypt the plaintext data to the ciphertext data and decrypt the ciphertext data to the plaintext data using the one or more encryption algorithms and the plurality of keys; wherein each of the first plurality of interfaces and the second plurality of interfaces is matched with a corresponding of the plurality of encryption engines; wherein the plurality of keys are matched with a corresponding of the plurality of encryption engines such that the one or more key registers maintains an independent key for each of the plurality of encryption engines; wherein the control engine is configured to selectively sanitize the ciphertext data by selectively sanitizing an associated key from the one or more key registers.

2. The inline encryptor ASIC of claim 1, wherein at least one of the first plurality of interfaces comprises one of Quad Serial Peripheral Interface (QSPI), Serial Peripheral Interface (SPI), Secure Digital (SD), SD Input/Output (SDIOU), Embedded MultiMediaCard (eMMC), Double Data Rate (DDR), Serial Advanced Technology Attachment (SATA), Peripheral Component Interconnect express (PCIe), Compute Express Link (CXL), Ethernet, or Serializer/De-serializer (SERDES).

3. The inline encryptor ASIC of claim 1, wherein each of the first plurality of interfaces is assigned a dedicated protocol.

4. The inline encryptor ASIC of claim 3, wherein at least two of the first plurality of interfaces share the dedicated protocol in common.

5. The inline encryptor ASIC of claim 1, wherein the one or more protocol engines use a Transmission Control Protocol/Internet Protocol (TCP/IP) suite.

6. The inline encryptor ASIC of claim 1, wherein the one or more protocol engines use a User Datagram Protocol/Internet Protocol (UDP/IP) suite.

7. The inline encryptor ASIC of claim 1, wherein the control engine receives the control data over the control channel using at least one of joint test action group (JTAG) or Serial Peripheral Interface (SPI).

8. The inline encryptor ASIC of claim 1, wherein the control data comprises a configuration of the one or more encryption algorithms; wherein the control engine configures one or more encryption algorithms of the plurality of encryption engines based on the control data.

9. The inline encryptor ASIC of claim 1, comprising one or more control registers; wherein the one or more control registers specify a size of the plurality of keys and a configuration of the one or more protocol engines.

10. The inline encryptor ASIC of claim 1, wherein the one or more Post Quantum Cryptography algorithms are selected from the group consisting of Advanced Encryption Standard (AES), Cryptographic Suite for Algebraic Lattices (CRYS-TALS)-Kyber, CRYSTALS-Dilithium, Secure Hash Algorithm (SHA), Leighton-Micali Signature (LMS), and Xtended Merkle Signature Scheme (XMSS).

11. A computing system comprising:
an inline encryptor application specific integrated circuit (inline encryptor ASIC) comprising:
  a first plurality of interfaces; wherein the first plurality of interfaces transmit and receive plaintext data over a first plurality of traffic channels;
  a second plurality of interfaces; wherein the second plurality of interfaces transmit and receive ciphertext data over a second plurality of traffic channels; wherein each of the first plurality of interfaces is paired with a matching of the second plurality of interfaces to perform a protocol break;
  one or more protocol engines;
  one or more key registers;
  a control engine; wherein the control engine receives control data over a control channel; wherein the control data comprises a plurality of keys; wherein the control engine causes the one or more key registers to maintain the plurality of keys; and
  a plurality of encryption engines; wherein the plurality of encryption engines are configured to execute one or more encryption algorithms; wherein the one or more encryption algorithms comprise one or more Post Quantum Cryptography algorithms; wherein the plurality of encryption engines are configured to encrypt the plaintext data to the ciphertext data and decrypt the ciphertext data to the plaintext data using the one or more encryption algorithms and the plurality of keys; wherein each of the first plurality of interfaces and the second plurality of interfaces is matched with a corresponding of the plurality of encryption engines; wherein the plurality of keys are matched with a corresponding of the plurality of encryption engines such that the one or more key registers maintains an independent key for each of the plurality of encryption engines; wherein the control engine is configured to selectively sanitize the ciphertext data by selectively sanitizing an associated key from the one or more key registers;
a central processing unit (CPU); and
one or more peripherals;
wherein the inline encryptor ASIC is coupled between the CPU and the one or more peripherals.

12. The computing system of claim 11, wherein the inline encryptor ASIC prevents the CPU from writing the plaintext data to the one or more peripherals.

* * * * *